United States Patent [19]

Tanaka et al.

[11] Patent Number: 5,556,920
[45] Date of Patent: Sep. 17, 1996

[54] STRETCHED POLYPROPYLENE FILM

[75] Inventors: Shinsuke Tanaka; Manabu Kaminaka; Isao Masada; Junichi Fujii; Naoki Ueda, all of Tokuyama, Japan

[73] Assignee: Tokuyama Corporation, Yamaguchi-ken, Japan

[21] Appl. No.: 499,195

[22] Filed: Jul. 7, 1995

[30] Foreign Application Priority Data

| Jul. 8, 1994 | [JP] | Japan | 6-157168 |
| Aug. 4, 1994 | [JP] | Japan | 6-183629 |
| Mar. 29, 1995 | [JP] | Japan | 7-071014 |

[51] Int. Cl.$^6$ ............ C08L 45/00; C08L 23/10
[52] U.S. Cl. ............ 525/216; 525/106; 525/164; 525/227; 525/240; 524/430; 524/451; 524/570; 524/584; 526/127; 526/160; 526/308; 526/348.1; 428/516; 428/523; 428/910
[58] Field of Search ............ 428/516, 523, 428/910; 526/308, 348.1; 525/106, 164, 210, 227, 240; 524/430, 570, 584, 451

[56] References Cited

U.S. PATENT DOCUMENTS

| 4,603,174 | 7/1986 | Okada et al. | 526/348.1 X |
| 5,141,994 | 8/1992 | Kakugo et al. | 525/216 |
| 5,362,782 | 11/1994 | McCullough, Jr. et al. | 525/216 X |

FOREIGN PATENT DOCUMENTS

| 0148621 | 7/1985 | European Pat. Off. |
| 0171199 | 2/1986 | European Pat. Off. |
| 45-32430 | 10/1970 | Japan |
| 52-5935 | 2/1977 | Japan |
| 5-140222 | 6/1993 | Japan |
| 5-140223 | 6/1993 | Japan |
| 5-339327 | 12/1993 | Japan |
| 6-128317 | 5/1994 | Japan |
| 6-128318 | 5/1994 | Japan |
| 6-179709 | 6/1994 | Japan |
| 6-179717 | 6/1994 | Japan |

OTHER PUBLICATIONS

"Influence of Nucleating Agents on Crystallization of Polypropylene", J. Thermal Analy., 28, 161 (1983).
"DTA Study of Heterogeneous Nucleation of Crystallization in Polypropylene", J. Appl, Polym. Sci., 9, 2131 (1965).
"Correlation between $^{13}$C NMR ChemicalShifts and Conformation Polymers 3. Hexad Sequence Assignments of Methylene Spectra of Polproplyene", Zambelli et al. in Macromolecules, 13, 267 (1980).
"The Microstructure of Poly(cyclopentene) Produced by Polymerization of Cyclopentene with Homogeneous Ziegler–Natta Catalysts", S. Collins and W. Mark Kelly, Macromolecules, 25, 233 (1992).
"Crystal Structure of Isotactic Polypropylene", Journal of Macromolecular Science, Physics B6, 101 (1972).
Patent Abstracts of Japan, unexamined applications, C field, vol. 18, No. 32, Jan. 18, 1994, The Patent Office Japanese Government, p. 152 C 1154.

*Primary Examiner*—Fred Teskin
*Attorney, Agent, or Firm*—Wenderoth, Lind & Ponack

[57] ABSTRACT

An at least monoaxially stretched polypropylene film made of a composition comprising a crystalline polypropylene and a monocyclic olefin polymer (e.g. a polycyclobutene or a polycyclopentene), wherein the content of the monocyclic olefin polymer is 0.1–1,000 ppm by weight.

The polypropylene film is superior not only in transparency but also in image clarity by which an image is clearly seen through the film.

The polypropylene film, when further comprising talc having an average particle diameter of 0.1–10 μm in an amount of 50–4,000 ppm by weight, can prevent the surface roughening or edge roughening of sheet during the sheet formation conducted before stretched film production.

The polypropylene film, when further comprising an anti-blocking agent and a polyethylene together, can prevent the generation of voids caused by the anti-blocking agent.

32 Claims, No Drawings

STRETCHED POLYPROPYLENE FILM

BACKGROUND OF THE INVENTION

1. Field of the Invention

The present invention relates to a stretched polypropylene film. More particularly, the present invention relates to a stretched polypropylene film comprising a crystalline polypropylene and a small amount of a monocyclic olefin polymer, which is significantly improved in transparency and image clarity.

2. Description of the Prior Art

Polypropylene sheets formed by extrusion are widely used in applications such as food packaging, food container and the like. Stretched polypropylene films, particularly biaxially stretched polypropylene films are widely used in packaging materials, etc. for their excellent mechanical and optical properties. They are produced generally by successive biaxial stretching using a tenter. These polypropylene sheets and stretched polypropylene films, however, are generally inferior in transparency and image clarity to highly transparent thermoplastic resins such as polystyrene, polyvinyl chloride and the like, owing to the high crystallinity of polypropylene.

Various attempts have been made in order to improve the transparency and image clarity of polypropylene sheets and stretched polypropylene films. For example, it is known that addition, to a polypropylene, of an organic or inorganic nucleating agents such as sorbitol derivative, alkali metal or aluminum salt of aromatic carboxylic acid, talc or the like makes smaller and more uniform the polypropylene spherulites and improves the transparency of stretched polypropylene film [J. Thermal Analy., 28, 161 (1983); Japanese Patent Publication No. 5935/1977; J. Appl. Polym. Sci., 9, 2131 (1965)]. These organic nucleating agents, however, showed bleeding from polypropylene during extrusion, inviting roll fouling, and gave out an offensive odor during processing. The salt of aromatic carboxylic acid reacted with other additive by itself or when hydrolyzed, deteriorating the inherent capability of the additive or inviting the coloring of polypropylene.

Talc, which is a well-known inorganic nucleating agent, showed insufficient dispersion, which allowed the polypropylene sheet or film to vary in optical properties such as transparency and the like and generated small lumps or fish eyes owing to the agglomeration of talc.

Meanwhile, it was attempted to improve the transparency of polypropylene by addition of propylene-α-olefin copolymer (GB 1104665-A corresponding to Japanese Patent Publication No. 32430/1970). In this attempt, however, no sufficient image clarity if obtained.

Thus, it has been tried to improve the transparency and image clarity of polypropylene sheet or stretched polypropylene film by the above attempts. However, no satisfactory improvement is obtained yet.

Meanwhile in U.S. Pat. No. 5,331,057 corresponding to Japanese Patent Application Kokai (Laid-Open) No. 339327/1993 is disclosed a process for producing a bock copolymer by polymerizing 0.1–95% by weight of a particular bicycloolefin, 0–95% by weight of a cycloolefin and a non-cyclic olefin in the presence of a catalyst comprising a particular metallocene. In this literature, however, no mention is made on the formation of a stretched film from said block copolymer, or on the transparency and image clarity of the stretched film.

Further in Japanese Patent Application Kokai (Laid-Open) Nos. 140222/1993, 140223/1993, 128317/1994, 128318/1994, 179709/1994 and 179717/1994 are disclosed a catalyst for olefin polymerization obtained by polymerizing a cycloolefin in the presence of a solid catalyst component (using, as an essential component, Mg and V or a mellocene compound of a transition metal) and an organoaluminum compound and contacting the resulting product with a titanium compound; and techniques similar thereto. In these literatures, however, no mention is made on the formation of a stretched film from the polymer obtained, or on the transparency and image clarity of the stretched film.

SUMMARY OF THE INVENTION

The object of the present invention is to provide a stretched polypropylene film which is free from the above-mentioned problems and which has excellent transparency and image clarity.

In order to achieve the above object, the present inventors made a study on a stretched polypropylene film with improved transparency and image clarity. As a result, the present inventors surprisingly found out that simple addition of a small amount of a particular polymer (a monocyclic olefin polymer) to a polypropylene can provide a stretched polypropylene film which is significantly improved in transparency and image clarity, which causes no bleeding during extrusion and which has excellent formability. The finding has led to the completion of the present invention.

According to the present invention, the above object can be achieved by a stretched polypropylene film comprising a crystalline polypropylene and a monocyclic olefin polymer, wherein the content of the monocyclic olefin polymer is 0.1–1,000 ppm by weight and which film is stretched at least monoaxially.

DETAILED DESCRIPTION OF THE INVENTION

The crystalline polypropylene used in the present invention includes a propylene homopolymer, a propylene-other α-olefin random copolymer and a mixture thereof. The α-olefin includes, for example, ethylene, 1-butene, 1-pentene, 1-hexene, 1-heptene, 1-octene, 1-nonene, 1-decene and 4-methyl-1-pentene. The content of the α-olefin is preferably 10 mole % or less in view of the desired crystallinity level of the crystalline polypropylene.

The crystalline polypropylene used in the present invention has no particular restriction as to the melt flow rate. In view of its formability into a stretched film, the melt flow rate is generally 0.01–100 g/10 min, preferably 0.1–50 g/10 min, more preferably 1–10 g/10 min.

The crystalline polypropylene used in the present invention is crystalline and its fraction of isotactic pentad sequence is preferably 0.85 or more. Herein, "fraction of isotatic pentad sequence" refers to a fraction of five propylene units consecutively bonded in a meso form, measured by the method reported by A. Zambelli et al. in Macromolecules, 13, 267 (1980), i.e. $^{13}$C-NMR.

The crystalline polypropylene used in the present invention has no particular restriction as to the molecular weight distribution, i.e. the ratio (Mw/Mn) of weight-average molecular weight (Mw) to number-average molecular weight. However, the molecular weight distribution (Mw/Mn) is preferably 6–20 so as to obtain higher melt tension and increased processability during film production. The molecular weight distribution is measured by gel permeation chromatography (hereinafter referred to as GPC, in some cases), wherein a standard polystyrene-corrected calibration curve is used.

In the present invention, the monocyclic olefin polymer is a polymer of a monomer having one ring and, in the ring, one or two polymerizable double bonds, and may be any known compound as long as it is such a polymer. The monocylic olefin polymer is preferably a homopolymer of a monocyclic olefin monomer having 4–20 carbon atoms, a block or random copolymer between said monocyclic olefin monomers, or a block or random copolymer between 50 mole % or more of said monocyclic olefin monomer and 50 mole % or less of other monomer. The above monocyclic olefin monomer having 4–20 carbon atoms is represented by the following general formula

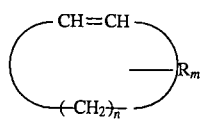

[wherein n is an integer of 2–3, and the hydrogen atoms may be replaced by m alkyl groups R each having 1–4 carbon atoms (m is an integer of 0 to (2n+2))]. Preferable examples of the monocylic olefin monomer are cyclobutene, cyclopentene, cyclopentadiene, 4-methylcyclopentene, 4,4-dimethylcyclopentene, cyclohexene, 4-methylcyclohexene, 4,4-dimethylcyclohexene, 1,3-dimethylcyclohexene, 1,3-cyclohexadiene, 1,4-cyclohexadiene, cycloheptene, 1,3-cycloheptadiene, 1,3,5-cycloheptatriene, cyclooctene, 1,5-cyclooctadiene and cyclododecene. Preferable examples of the other monomer are α-olefins such as ethylene, propylene, 1-butene, 3-methyl-1-butene, 3-methyl-1-pentene, 4-methyl-1-pentene and the like.

The monocyclic olefin polymer has stereoregularity and is generally crystalline. Therefore, the polymer give diffraction peaks derived from the crystallinity when subjected to X-ray diffraction. For example, the polycyclopentene used in Example 1 (described later) gives diffraction peaks at $2\theta=19.4°$, 16.0°, 24.0° and 34.5° at integral intensities of 28:14:2:1 respectively. The crystallinity of the monocyclic olefin polymer used in the present invention is preferably 10% or more, more preferably 30% or more, most preferably 50% or more because a higher crystallinity tends to give higher transparency and better image clarity. As the monocyclic olefin polymer having such a high crystallinity, there can preferably be used, as mentioned above, a homopolymer of the above-mentioned monocyclic olefin monomer, a block or random copolymer between said monocyclic olefin monomers, or a block or random copolymer between said monocyclic olefin monomer and other α-olefin.

The polymermization process for producing the monocyclic olefin polymer used in the present invention has no particular restriction as long as the meritorious effected of the present invention is not impaired. For example, the following polymerization process can be used. First, the catalyst may be, for example, a metallocene catalyst generally comprising a metallocene compound of a transition metal of periodic table group IV and methylaluminoxane or alkylaluminum; a vanadium catalyst; a titanium catalyst comprising a magnesium compound (e.g. magnesium chloride) and titanium trichloride or tetrachloride supported thereon; an anionic polymerization catalyst; or a radical polymerization catalyst. These catalyst may be used singly or in combination. Of these, preferred is a metallocene catalyst, a vanadium catalyst or a titanium catalyst. Any of gas phase polymerization, solution polymerization, bulk polymerization, etc. can be used.

While the monocyclic olefin polymer used in the present invention has no particular restriction as to the kind of bonding, the monocyclic olefin polymers produced by the method of S. Collins and other [S. Collins and W. Mark Kelly, Macromolecules, 25, 233 (1992)] are proposed to have a cis-1,3 bond when measured by $^{13}$C-NMR.

In the present invention, the content of the monocyclic olefin polymer in the crystalline polypropylene must be 0.1–1,000 ppm by weight. The content is preferably 0.5–500 ppm by weight, more preferably 0.5–100 ppm by weight, most preferably 1–20 ppm by weight. When the content of the monocyclic olefin polymer is less than 0.1 ppm by weight, no improvement in transparency or image clarity is obtained. When the content is more than 1,000 ppm by weight, there occurs deterioration in transparency and image clarity; the frequency of film rupture during processing; and moreover there is no merit from economical standpoint. When the monocyclic olefin polymer is a copolymer between a monocyclic olefin monomer and other monomer, it is necessary that the content of the polymer portion based on the monocyclic olefin monomer is in the above range.

There is no particular restriction as to the method by which the monocyclic olefin polymer is incorporated into the crystalline polypropylene. Said method includes a simple mixing method, a so-called block copolymerization method, etc. Specifically, there can be mentioned, for example, a method of producing a monocyclic olefin polymer by polymerization, adding the polymer to a crystalline polypropylene, and mixing them by the use of a screw extrusion kneader (e.g. a single-screw extruder or a twin-screw extruder), a Banbury mixer, a continuous mixer, a mixing roll or the like; and a method of subjecting a monocyclic olefin to preliminary polymerization and then polymerizing propylene to conduct block copolymerization to obtain a composition.

It is also possible to obtain a crystalline polypropylene composition containing a monocyclic olefin polymer at a high concentration, according to the above-mentioned method and then dilute the composition (used as a master batch) with other crystalline polypropylene at a dilution of 2- to 1,000-fold (thereby the content of the monocyclic olefin polymer is diluted 0.5- to 0.001-fold) to obtain an intended monocyclic olefin polymer content. Generally, the dilution of the master batch is about 20-fold. In the present invention, however, even when the dilution of the master batch is fairly high (it varies depending upon the master batch concentration), the resulting stretched film is sufficiently improved in transparency and image clarity.

The stretched polypropylene film of the present invention has no particular restriction as to the thickness. However, the thickness is generally 3–150 μm in the case of a biaxially stretched film and 10–254 μm in the case of a monoaxially stretched film. The stretched polypropylene film of the present invention is stretched at least monoaxially. Of course, it may be stretched biaxially. There is no particular restriction as to the draw ratio of said film. The draw ratio, however, is preferably 4- to 10-fold in a monoaxial direction and, in the case of biaxial stretching, further 4- to 15-fold in a direction transverse to the direction of monoaxially stretching.

The stretched polypropylene film of the present invention may further comprise talc having an average particle diameter of 0.1–10 μm, in an amount of 50–4,000 ppm by weight. Addition of talc enables production of the stretched polypropylene film of the present invention at good formability without inviting edge roughening of sheet, etc.

The average particular diameter of the talc used in the present invention must be 0.1–10 μm. It is preferably 0.5–8.0 μm, more preferably 1.0–7.0 μm. When said diameter is smaller than 0.1 μm, talc gives rise to secondary agglomeration and the resulting particles have large diameters, resulting in reduction in transparency, generation of fish eyes and deterioration of film appearance. When said diameter is larger than 10 μm, a number of voids generate during film stretching, resulting in reduced film transparency. As to the method for measurement of the average particle diameter of the talc used in the present invention, there is no particular restriction. However, there can be mentioned, as said method, those using Coulter counter, electron microscope, etc. As the talc used in the present invention, there can be used any known talcs such as pulverized natural products, synthetic products and the like. However, a highly crystalline talc is preferred in view of the nucleating effect to polypropylene.

In the present invention, the content of talc in crystalline polypropylene must be 50–4,000 ppm by weight. It is preferably 80–2,000 ppm by weight, more preferably 100–1,000 ppm by weight. When said content is less than 50 ppm by weight, no sufficient nucleating effect of talc is obtained and the raw sheet causes edge roughening. When said content is more than 4,000 ppm by weight, there occurs reduction in film transparency and there appears deterioration of appearance associated with voids generation.

The reasons are not clarified yet as to why in the present invention, the crystalline polypropylene containing a monocyclic olefin polymer has improved sheet and film formability when a small amount of talc is added thereto. However, the present inventors presume the reasons to be as follows based on the following analytical results.

In-depth analysis of the orientation pattern of polypropylene crystals in the casting sheet of a crystalline polypropylene containing a monocyclic olefin polymer, a wide-angle X-ray diffractometry indicated that the $a^{\ddagger}$-axis of polypropylene crystals is highly oriented perpendicularly to the sheet surface (in the thickness direction of sheet). That is, when an X-ray is perpendicularly applied to the sheet surface while the sheet is being rotated at a high speed about an axis perpendicular to the sheet surface and the intensity of diffraction is measured, 040 reflection (2θ=17.1°) from polypropylene crystals is observed strongly. When peak separation is conducted from the measured X-ray diffraction profile and calculation is made for the peak intensity ratio I(040)/I(111) of 040 reflection peak intensity I(040) to 111 reflection peak intensity I(111), the peak intensity ratio is larger when the content of monocyclic olefin polymer is higher. According to Z. Mencik, Journal of Macromolecular Science, Physics B6, 101 (1972), the peak intensity ratio I(040)/I(111) is 1.52 when the polypropylene crystals have complete random orientation. From this it is appreciated that, in the raw sheet of a crystalline polypropylene containing a monocyclic olefin polymer, the 040 face of each polypropylene crystal is highly oriented perpendicularly to the sheet surface (that is, the b-axis of each crystal is oriented parallel to the sheet surface). Also, it became clear that since the c-axis of each crystal (the molecular chain axis of polypropylene) is oriented in the extrusion direction (parallel to the sheet surface), the $a^{\ddagger}$-axis of each crystal is oriented perpendicularly to the sheet surface (in the thickness direction of sheet).

From the above, the followings are inferred. When a monocyclic olefin polymer is incorporated into a crystalline polypropylene and a raw sheet is made from the mixture, polypropylene crystals grow, during the cooling and solidification of molten resin, in the thickness direction of sheet starting from the chill roll side of sheet; at this time, since the differences in shrinkage, internal stress, etc. are large between the chill roll side and the other side, the adhesion between the sheet and the chill roll is low, inviting nonuniform sheet chill, sheet separation from roll, surface roughening of sheet and inferior condition of sheet edge.

In contrast, when talc is (known as inorganic nucleating agent for polypropylene) is added to a crystalline polypropylene containing a monocyclic olefin polymer, the peak intensity ratio I(040)/I(111) of 040 reflection peak intensity I(040) to 111 reflection peak intensity I(111) is 1 or less, and it is smaller when the talc content is higher. It is appreciated that in the sheet of a crystalline polypropylene containing talc, the 040 reflection of each polypropylene crystal is higher oriented parallel to the sheet surface, that is, the b-axis of each crystal is highly oriented perpendicularly to the sheet surface. Consequently, it became clear that the $a^{\ddagger}$-axis of each crystal is oriented parallel to the sheet surface (oriented inside the sheet plane). It is known that talc also has a nucleating effect to polypropylene, and talc, when added to a crystalline polypropylene, shows about the same nucleating effect as a monocyclic olefin polymer in increase in crystallization temperature, etc.; however, the talc-added crystalline polypropylene causes no edge roughening of sheet. The reason is presumed to be that in the talc-added crystalline polypropylene, polypropylene crystals grow in the sheet plane during the cooling and solidification of molten resin at sheet formation, making the differences of the shrinkage and stress change in sheet thickness direction smaller, whereby the adhesion between sheet and cooling roll is good and the condition of sheet edge is not deteriorated.

Hence, it became clear that by adding a monocyclic olefin polymer and talc to a crystalline polypropylene in appropriate amounts and proportions, the orientation (i.e. growing direction) of polypropylene crystals in the resulting sheet can be controlled.

Based on the above analytical results, the present inventors found out that by adding talc to a crystalline polypropylene containing a monocyclic olefin polymer, to suppress the growth of polypropylene crystals in sheet thickness direction, occurring during sheet formation, a sheet can be formed stably without inviting the edge roughening of sheet. The stretched film made from the sheet is improved in transparency and image clarity probably because the nucleating effect of both the monocyclic olefin polymer and talc makes the size of spherulites in the sheet smaller and more homogeneous.

In the stretched polypropylene film of the present invention, an anti-blocking agent may be added in order to prevent the blocking of said film. In the resulting film comprising a crystalline polypropylene, a monocyclic olefin polymer and said anti-blocking agent, however, peeling occurs, during the stretching, at the boundaries between the crystalline polypropylene and the anti-blocking agent, generating voids and significantly reducing the film appearance. This problem can be solved by further adding a polyethylene. By adding a polyethylene in a small amount, the resulting stretched polypropylene film is significantly improved in transparency, image clarity and anti-blocking property; generates, during the stretching, a greatly reduced number of voids caused by the anti-blocking agent; and has excellent appearance.

The anti-blocking agent used in the present invention may be any inorganic or organic anti-blocking agent used to impart anti-blocking property to films.

Examples of the inorganic anti-blocking agent are silica, alumina, zeolite, kaolin and calcium carbonate. Of these, silica (dry process silica or wet process silica, flame fused silica) is preferred.

Examples of the organic anti-blocking agent are a crosslinked polymethyl methacrylate powder, a non-fused silicone resin powder, a melamine resin powder and a polyamide resin powder. Of these, a crosslinked polymethyl methacrylate powder and a non-fused silicone resin powder are preferred.

There is no particular restriction as to the shape of the anti-blocking agent used in the present invention. However, spherical particles are preferred because they give an excellent anti-blocking effect. The average particle diameter of the anti-blocking agent used in the present invention is preferably 0.1–5.0 μm, more preferably 0.5–3.0 μm in view of the anti-blocking effect of the agent and the transparency and appearance of the resulting film.

The amount of the anti-blocking agent added to the crystalline polypropylene must be 0.01–1.0 part by weight. It is preferably 0.02–0.5 part by weight, more preferably 0.05–0.3 part by weight. When the amount of the anti-blocking agent added is less than 0.01 part by weight, no sufficient anti-blocking effect is obtained and the resulting stretched film causes blocking. When the amount is more than 1.0 part by weight, the resulting stretched film has reduced transparency, an increased number of voids, and has inferior appearance.

The polyethylene used in the present invention includes an ethylene homopolymer, a random copolymer between ethylene and other α-olefin, a mixture thereof, etc. The other α-olefin includes, for example, propylene, 1-butene, 1-pentene, 1-hexene, 1-heptene, 1-octene, 1-nonene, 1-decene and 4-methyl-1-pentene. The amount of the other α-olefin used is preferably 10 mole % or less.

As the polyethylene used in the present invention, preferred are a high-density polyethylene and a linear low-density polyethylene both obtained by a medium to low pressure process, a low-density polyethylene obtained by a high pressure process, various polyethylene waxes, etc. The linear low-density polyethylene is an ethylene copolymer obtained by copolymerizing ethylene and a small amount of an α-olefin typified by propylene, 1-butene, 1-hexene, 1-octene, 4-methyl-1-pentene or the like, in the presence of a catalyst such as transition metal compound, organometal compound or the like, and preferably has short chain branches having 10 or less carbon atoms.

The polyethylene used in the present invention has no particular restriction as to the melt flow rate. The melt flow rate, however, is preferably 0.1–50 g/10 min, more preferably 0.5–10 g/10 min in view of the compatibility of the polyethylene with the crystalline polyethylene during kneading. The density of the polyethylene is not particularly restricted, either. It, however, is preferably 0.95–0.97 g/cm$^3$ in the case of a high-density polyethylene, 0.89–0.95 g/cm$^3$ in the case of a linear low-density polyethylene and 0.89–0.94 g/cm$^3$ in the case of a low-density polyethylene.

The amount of the polyethylene incorporated into the crystalline polypropylene must be 0.01–1.0 part by weight. It is preferably 0.02–0.5 part by weight, more preferably 0.05–0.3 part by weight. When the amount is less than 0.01 part by weight, a very large number of voids are generated owing to the anti-blocking agent and the resulting stretched film has inferior appearance. When the amount is more than 1.0 part by weight, the resulting stretched film has whitening and accordingly lower transparency.

The stretched polypropylene film of the present invention may comprise, as necessary, additives such as antioxidant, chlorine-capturing agent, heat stabilizer, antistatic agent, anti-fogging agent, ultraviolet absorber, lubricant, pigment, other resin, filler and the like as long as the effect of the present invention is not impaired.

The stretched polypropylene film of the present invention may be subjected, as necessary, to surface treatments such as corona discharge and the like, at one side or both sides. The stretched polypropylene film of the present invention may be laminated, at one side of both sides, with a layer of other resin having a lower melting point than the present crystalline polypropylene has, in order to allow said film to have heat-sealability. The method for lamination with other resin is not particularly restricted, but is preferably co-extrusion, lamination or the like.

The stretched polypropylene film of the present invention can be produced by a known process without any restriction. The production of a polypropylene sheet can be conducted, for example, by a process which comprises subjecting a composition of a crystalline polypropylene and a monocyclic olefin polymer (the amount of the latter is 0.1–1,000 ppm by weight) to melt extrusion by a T-die method and passing the extrudate through a cooling roll combined with an air-knife or through nip rolls to form a sheet. The production of a biaxially stretched film by successive biaxial stretching using a tenter is preferably conducted by a process which comprises forming a sheet or film from the above-mentioned composition by a T-die method, an inflation method or the like, then feeding the sheet or film into a longitudinal stretching machine to conduct longitudinal stretching of 4- to 10-fold at a heating roll temperature of 120°–170° C., and subjecting the monoaxially stretched film to transverse stretching of 4- to 15-fold by the use of a tenter at a tenter temperature of 130°–180° C. The resulting biaxially stretched film is further subjected, as necessary, to a heat treating of 80°–180° C. (in this heat treatment, transverse relaxation of 0–25% is allowed). Of course, further stretching may be conducted after the above stretching. In the longitudinal stretching, it is possible to combine multi-stage stretching, rolling, drawing, etc. Monoaxial stretching alone may be adopted to obtain a stretched film.

According to the present invention, there can be obtained a stretched polypropylene film which is improved in transparency and image clarity, which causes no roll fouling during extrusion, and which has excellent formability.

When talc is added, the resulting stretched polypropylene film of the present invention is improved in transparency and image clarity, causes no surface roughening or edge roughening of sheet during formation of raw sheet, gives no film cutting, no uneven film thickness due to uneven stretching or no film rupture during stretching, and has excellent formability.

When an anti-blocking agent and a polyethylene are added, the resulting stretched polypropylene film of the present invention is significantly improved in transparency, image clarity and anti-blocking property, generates, during stretching, a very small number of voids caused by the anti-blocking agent, and has excellent appearance.

The present invention is hereinafter described specifically by way of Examples and Comparative Examples. However, the present invention is not restricted to these Examples. Evaluation of the stretched polypropylene films obtained in Examples and Comparative Examples were made as follows.

(1) Haze

Measured in accordance with JIS K 6714.

(2) Image clarity

The image clarity of a film is independent of the transparency of the film and shows the transmittability of parallel lights through the film. In a film having a higher image clarity, an image can be seen clearly through the film.

Image clarity was measured in accordance with JIS K 7105. That is, the image clarity of a biaxially stretched film was measured by the transmission method specified in JIS K 7105, by the use of an image clarity meter ICM-1DP (a product of Suga Test Instruments Co., Ltd.) and an optical comb of 0.125 mm with the film arranged so that the transverse stretching direction of the film was parallel to the comb direction.

(3) Anti-blocking property

A stretched polypropylene film having a thickness of 50 μm was cut into rectangles of 300 mm (in the longitudinal stretching direction)×40 mm (in the transverse stretching direction). They were laminated in a thickness of 3 mm. The laminate was allowed to stand in an atmosphere of 30° C. and 70% relative humidity for 24 hours, and a pressure of 20 kg/cm$^2$ was applied thereto for 30 seconds by the use of a press. Then, the both ends of the resulting laminate was fixed with zigs to measure the bending strength of the laminate by the use of an autograph (a product of Shimadzu Corporation). The bending strength obtained was taken as a yardstick for the anti-blocking of the film.

(4) Appearance

A film was cut into 200 mm×200 mm and interposed between two polarizing films intersecting at right angles. They were placed on a light box to visually measure the number of the voids (fish eyes) of 300 μm or more (in longer diameter) formed by the anti-blocking agent used in the film. This produce was conducted 15 times and an average number of voids was determined. From the average number of voids was calculated a number of voids per m$^2$. The appearance of the film was rated as follows, based on the number of voids per m$^2$.

⊚: the number of voids is less than 20 m$^2$.

o: the number of voids is 20/m$^2$ to less than 100/m$^2$.

Δ: the number of voids is 100/m$^2$ to less than 500/m$^2$.

X: the number of voids is 500/m$^2$ or more.

EXAMPLE 1

(Polymerization of cyclopentene)

500 ml of toluene, 500 mmol of methylaluminoxane and 0.5 mmol of dimethylsilylenebisindenylzirconium dichloride were introduced into a 2,000-ml glass reactor equipped with a stirrer, under a nitrogen atmosphere. The system inside was heated to 60° C. 100 ml of cyclopentene was added and polymerization was conducted at 60° C. for 4 hours. The reaction mixture containing a solid product was poured into a large amount of acidic methanol to terminate the polymerization. Filtration was conducted to collect the solid product, followed by drying of the product under reduced pressure to obtain 63.5 g of a polycyclopentene. The polymer had a crystallinity of 64% as measured by X-ray diffractometry.

(Preparation of pellets)

To 100 parts by weight of a powdery homopolypropylene shown in Table 1 were added 0.1 part by weight of 2,6-di-t-butylhyroxytoluene (antioxidant), 0.1 part by weight of calcium stearate (chlorine-capturing agent) and 100 ppm (by weight) of the polycyclopentene obtained above. They were mixed for 5 minutes by the use of a 100-1 Henschel mixer. The mixture was extracted at 230° C. by the use of an extruder having a screw diameter of 65 mm, to obtain pellets as a film raw material.

The above-obtained pellets of a polypropylene resin composition was subjected to a test for production of biaxially stretched film according to the following method. The pellets were extruded at 280° C. by the use of a T-die sheet extruder having a screw diameter of 90 mm, followed by cooling by the use of a chill roll of 30° C. to obtain a sheet having a thickness of 2 mm. The sheet was stretched by the use of a successive biaxial stretching machine of tenter type; that is, the sheet was stretched 4.6-fold in the longitudinal direction at 150° C. and successively 10-fold (in terms of mechanical draw ratio) in the transverse direction in a tenter of 165° C., followed by 8% relaxation and a heat treatment to form a biaxially stretched polypropylene film having a thickness of 50 μm, at a rate of 16 m/min. The roll fouling during film formation was examined visually. The film was measured for haze and image clarity, after 48 hours from the production. The results are shown in Table 1.

EXAMPLES 2–4

The procedure of Example 1 was repeated except that the amount of the polycyclopentene was changed as shown in Table 1. The results are shown in Table 1.

COMPARATIVE EXAMPLE 1

The procedure of Example 1 was repeated except that no monocyclic olefin polymer was used. The results are shown in Table 1.

COMPARATIVE EXAMPLES 2–4

The procedure of Example 1 was repeated except that the amount of the polycyclopentene was changed as shown in Table 1. The results are shown in Table 1.

EXAMPLES 5–6

The pellets obtained in Example 1 and the pellets obtained in Comparative Example 1 were dry-blended at a 1:1 weight ratio to dilute the polycyclopentene content 0.5-fold (Example 5). The pellets obtained in Example 1 and the pellets obtained in Comparative Example 1 were dry-blended at a 1:9 weight ratio to dilute the polycyclopentene content 0.1-fold (Example 6). The resulting pellets were subjected to the same procedure as in Example 1. The results are shown in Table 1.

EXAMPLES 7–8

The pellets obtained in Example 4 and the pellets obtained in Comparative Example 1 were dry-blended at a 1:9 weight ratio to dilute the polycyclopentene content 0.1-fold (Example 7). The pellets obtained in Example 4 and the pellets obtained in Comparative Example 1 were dry-blended at a 1:19 weight ratio to dilute the polycyclopentene content 0.05-fold (Example 8). The resulting pellets were subjected to the same procedure as in Example 1. The results are shown in Table 1.

COMPARATIVE EXAMPLE 5

The pellets obtained in Example 4 and the pellets obtained in Comparative Example 1 were dry-blended at a 1:999 weight ratio to dilute the polycyclopentene content 0.001-fold. The resulting pellets were subjected to the same procedure as in Example 1. The results are shown in Table 1.

EXAMPLE 9

The procedure of Example 1 was repeated except that the homopolypropylene was changed to a powdery random ethylene-propylene copolymer containing 0.5 mole % of ethylene, having a melt flow rate of 1.8 g/10 min and the amount of the polycyclopentene was changed to 10 ppm by weight. The results are shown in Table 1.

EXAMPLES 10–11

The procedure of Example 9 was repeated except that the powdery random ethylene-propylene copolymer containing 0.5 mole % of ethylene was changed to a powdery random ethylene-propylene copolymer containing 1.0 mole % of ethylene, having a melt flow rate of 1.2 g/10 min (Example 10) or a powdery random butene-1-propylene copolymer containing 0.5 mole % of butene-1, having a melt flow rate of 2.0 g/10 min (Example 11). The results are shown in Table 1.

COMPARATIVE EXAMPLE 6

The procedure of Example 9 was repeated except that no cyclic olefin polymer was used. The results are shown in Table 1.

EXAMPLE 12

The pellets obtained in Example 9 and the pellets obtained in Comparative Example 6 were dry-blended at a 1:9 weight ratio to dilute the polycyclopentene content 0.1-fold. The resulting pellets were subjected to the same procedure as in Example 1. The results are shown in Table 1.

EXAMPLE 13

(Polymerization of cyclobutene)

500 ml of toluene, 500 mmol of methylaluminoxane and 0.5 mmol of dimethylsilylenebisindenylzirconium dichloride were introduced into a 2,000-ml glass reactor equipped with a stirrer, under a nitrogen atmosphere. The system inside was heated to 60° C. 200 ml of cyclobutene was added and the polymerization was conducted at room temperature for 2 hours. The reaction mixture containing a solid product was poured into a large amount of acidic methanol to terminate the polymerization. Filtration was conducted to collect the solid product, followed by drying of the product under reduced pressure to obtain 135 g of a polycyclobutene. The polymer had a crystallinity of 68% as measured by X-ray diffractometry.

The subsequent procedure was the same as in Example 1 except that there were used a homopolypropylene shown in Table 1 and the above-obtained polycyclobutene of an amount shown in Table 1. The results are shown in Table 1.

EXAMPLES 14–15

The procedure of Example 13 was repeated except that the amount of the polycyclobutene was changed as shown in Table 1. The results are shown in Table 1.

COMPARATIVE EXAMPLES 7–8

The procedure of Example 13 was repeated except that the amount of the polycyclobutene was changed as shown in Table 1. The results are shown in Table 1.

EXAMPLE 16

(Synthesis of polycyclopentene-containing catalyst component)

100 ml of hexane, 50 mmol of methylaluminoxane and 0.05 mmol of dimethylsilylenebis(methylindenyl)zirconium dichloride were introduced into a 500-ml glass reactor equipped with a stirrer. The system inside was heated to 60° C. 7.7 g of cyclopentene was added and polymerization was conducted at 60° C. for 1 hour. The resulting solid portion was separated by decantation and washed with 200 ml of hexane five times to obtain a solid catalyst component containing 1.6 g of a polycyclopentene, 40 mmol of aluminum and 0.045 mmol of zirconium. The crystallinity of the catalyst component, possessed by the polycyclopentene was 64% as measured by X-ray diffractometry.

(Synthesis of master batch)

3,000 ml of toluene and 30 mmol of triisobutylaluminum were introduced into a 5,000-ml pressure reactor. The system inside was heated to 40° C. Thereinto was introduced the above-obtained polycyclopentene-containing solid catalyst component in an amount of 0.01 mmol (in terms of zirconium). A propylene pressure of 3 kgG/cm$^2$ was applied and polymerization was conducted at 40° C. for 1 hour. The reaction mixture was poured into acidic methanol to terminate the polymerization. Filtration was conducted to collect the resulting solid, and the solid was dried under reduced pressure to obtain 330 g of a polymer (a master batch). The polycyclopentene content in the polymer was 1,100 ppm by weight as a result of the calculation from the polycyclopentene content in the solid catalyst component.

The thus-obtained master batch containing 1,100 ppm by weight of a polycyclopentene was added to a homopolypropylene shown in Table 1, to obtain a polypropylene resin composition containing 11 ppm by weight of a polycyclopentene. The results are shown in Table 1.

EXAMPLE 17

(Synthesis of cyclopentene-propylene copolymer)

300 ml of cyclopentene and 50 mmol of methylaluminoxane were introduced into a 500-ml glass reactor equipped with a stirrer. Propylene gas of atmospheric pressure was passed through the reactor at 30° C. for 15 minutes to saturate the reactor inside with propylene. Then, 0.005 mmol of dimethylsilylene(methylindenyl)zirconium dichloride and polymerization was conducted at 30° C. for 1 hour. The reaction mixture was poured into acidic methanol to terminate the polymerization. Filtration was conducted to collect the resulting solid, and the solid was dried under reduced pressure to obtain 13 g of a polymer (a cyclopentene-propylene copolymer). The cyclopentene content in the polymer was 62% as measured by $^{13}$C-NMR. The crystallinity of the polymer was 12% as measured by X-ray diffractometry.

The subsequent procedure was the same as in Example 1 except that the above-obtained cyclopentene-propylene copolymer was added to the homopolypropylene used in Example 16, so that the cyclopentene content became 20 ppm by weight. The results are shown in Table 1.

COMPARATIVE EXAMPLE 9

The procedure of Example 1 was repeated except that no polycyclopentene was used and 0.4 part by weight of dibenzylidenesorbitol was added as a nucleating agent. The results are shown in Table 1.

the polymerization. Filtration was conducted to collect the solid product, followed by drying of the product under reduced pressure to obtain 63.5 g of a polycyclopentene. The polymer had a crystallinity of 64% as measured by X-ray diffractometry.

TABLE 1

| | Cyclic olefin polymer | | Crystalline polypropylene | | | | Stretch film | | |
| | | | MFR | Other | | | | Image | |
| | Kind | Content (ppm by wt.) | (g/10 min) | comonomer (mole %) | Pentad fraction | Mw/Mn | Haze (%) | clarity (%) | Roll pollution |
|---|---|---|---|---|---|---|---|---|---|
| Example | | | | | | | | | |
| 1 | Polycyclopentene | 100 | 2.5 | — | 0.93 | 6.8 | 0.6 | 89 | None |
| 2 | Polycyclopentene | 500 | 2.5 | — | 0.93 | 6.8 | 0.6 | 88 | None |
| 3 | Polycyclopentene | 50 | 2.5 | — | 0.93 | 6.8 | 0.5 | 89 | None |
| 4 | Polycyclopentene | 10 | 2.5 | — | 0.93 | 6.8 | 0.5 | 92 | None |
| Comparative Example | | | | | | | | | |
| 1 | — | 0 | 2.5 | — | 0.93 | 6.8 | 1.0 | 23 | None |
| 2 | Polycyclopentene | 0.05 | 2.5 | — | 0.93 | 6.8 | 0.9 | 58 | None |
| 3 | Polycyclopentene | 5000 | 2.5 | — | 0.93 | 6.8 | 0.8 | 79 | None |
| 4 | Polycyclopentene | 20000 | 2.5 | — | 0.93 | 6.8 | 0.8 | 77 | None |
| Example | | | | | | | | | |
| 5 | Polycyclopentene | 50 | 2.5 | — | 0.93 | 6.8 | 0.6 | 89 | None |
| 6 | Polycyclopentene | 10 | 2.5 | — | 0.93 | 6.8 | 0.5 | 93 | None |
| 7 | Polycyclopentene | 1.0 | 2.5 | — | 0.93 | 6.8 | 0.5 | 91 | None |
| 8 | Polycyclopentene | 0.5 | 2.5 | — | 0.93 | 6.8 | 0.6 | 86 | None |
| Comparative Example 5 | Polycyclopentene | 0.01 | 2.5 | — | 0.93 | 6.8 | 0.9 | 46 | None |
| Example | | | | | | | | | |
| 9 | Polycyclopentene | 10 | 1.8 | Ethylene (0.5) | 0.96 | 6.2 | 0.5 | 91 | None |
| 10 | Polycyclopentene | 10 | 1.2 | Ethylene (1.0) | 0.96 | 6.2 | 0.4 | 93 | None |
| 11 | Polycyclopentene | 10 | 2.0 | Butene-1 (0.5) | 0.97 | 7.8 | 0.5 | 92 | None |
| Comparative Example 6 | — | 0 | 1.8 | Ethylene (0.5) | 0.96 | 6.2 | 0.9 | 36 | None |
| Example | | | | | | | | | |
| 12 | Polycyclopentene | 1.0 | 1.8 | Ethylene (0.5) | 0.96 | 6.2 | 0.5 | 90 | None |
| 13 | Polycyclobutene | 5 | 1.2 | — | 0.94 | 7.6 | 0.5 | 87 | None |
| 14 | Polycyclobutene | 10 | 1.2 | | 0.94 | 7.6 | 0.5 | 88 | None |
| 15 | Polycyclobutene | 20 | 1.2 | | 0.94 | 7.6 | 0.5 | 88 | None |
| Comparative Example | | | | | | | | | |
| 7 | Polycyclobutene | 0.01 | 1.2 | — | 0.94 | 7.6 | 0.9 | 68 | None |
| 8 | Polycyclobutene | 5000 | 1.2 | — | 0.94 | 7.6 | 0.8 | 73 | None |
| Example | | | | | | | | | |
| 16 | Polycyclopentene | 11 | 3.0 | — | 0.97 | 6.2 | 0.4 | 94 | None |
| 17 | Cyclopentene- propylene copolymer | 20* | 3.0 | — | 0.97 | 6.2 | 0.5 | 87 | None |
| Comparative Example 9 | — | 0 | 2.5 | — | 0.93 | 6.8 | 0.4 | 90 | Yes |

*Numerical 20 indicates the cyclopentene content of a composition comprising cyclopentene-propylene and homopolypropylene

EXAMPLE 18

(Polymerization of cyclopentene)

500 ml of toluene, 500 mmol of methylaluminoxane and 0.5 mmol of dimethylsilylenebisindenylzirconium dichloride were introduced into a 2,000-ml glass reactor equipped with a stirrer, under a nitrogen atmosphere. The system inside was heated to 60° C. 100 ml of cyclopentene was added and polymerization was conducted at 60° C. for 4 hours. The reaction mixture containing a solid product was poured into a large amount of acidic methanol to terminate (Preparation of pellets)

To 100 parts by weight of a powdery homopolypropylene shown in Table 2 were added 0.1 part by weight of 2,6-di-t-butylhydroxytoluene (antioxidant), 0.1 part by weight of calcium stearate (chlorine-capturing agent), 100 ppm (by weight) of the polycyclopentene obtained above, and 300 ppm by weight of talc having an average particle diameter of 4.2 μm. They were mixed for 5 minutes by the use of a 100-l Henschel mixer. The mixture was extruded at 230° C. by the use of an extruder having a screw diameter of 65 mm, to obtain pellets as a film raw material.

(Product of biaxially stretched film)

The above-obtained pellets of a polypropylene resin composition was subjected to a test for production of biaxially stretched film according to the following method. The pellets were extruded at 280° C. by the use of a T-die sheet extruder having a screw diameter of 90 mm, followed by cooling by the use of a chill roll of 30° C. to obtain a sheet having a thickness of 2 mm. The sheet was stretched by the use of a successive biaxial stretching machine of tenter type; that is, the sheet was stretched 4.6-fold in the longitudinal direction at 150° C. and successively 10-fold (in terms of mechanical draw ratio) in the transverse direction in a tenter of 165° C., followed by 8% relaxation and a heat treatment to form a biaxially stretched polypropylene film having a thickness of 50 μm, at a rate of 16 m/min.

The condition (roughening) of sheet edge was examined visually and rated according to the following yardstick.

⊚: The sheet edge adheres tightly to the cooling roll and is linear.

o: The sheet edge is slightly turned up from the chill roll in such an extent as to cause no problem in film formation.

Δ: The sheet edge is rough and has a wavy shape.

X: The sheet edge is rough and has a sawteeth shape.

The effect of uneven stretching on film thickness accuracy was examined by measuring a film thickness pattern by the use of an infrared thickness tester WEB GAGE (a product of Yokogawa Electric Corporation) provided between the tenter and the winder. The accuracy of film thickness was rated according to the following yardstick.

⊚: Less than ±1 μm o: ±1 μm to less than ±1.5 μm

Δ: ±1.5 μm to less than ±2 μm

X: ±2 μm or more

Stretching was conducted continuously for 5 hours and there were examined times of sheet cutting during longitudinal stretching and times of film rupture during transverse stretching by tenter. The resulting film was measured for haze and image clarity, after 48 hours from the film formation. The results are shown in Table 2.

EXAMPLES 19–22

The procedure of Example 18 was repeated except that the amount of the polycyclopentene was changed as shown in Table 2. The results are shown in Table 2.

EXAMPLES 23–25

The procedure of Example 18 was repeated except that the amount of talc was changed as shown in Table 2. The results are shown in Table 2.

EXAMPLES 26–27

The procedure of Example 18 was repeated except that the average particle diameter of talc was changed to 1.2 μm (Example 26) and 6.1 μm (Example 27). The results are shown in Table 2.

COMPARATIVE EXAMPLE 10

The procedure of Example 18 was repeated except that neither polycyclopentene (cyclic olefin polymer) nor talc was used. The results are shown in Table 2.

COMPARATIVE EXAMPLE 11

The procedure of Example 18 was repeated except that no polycyclopentene (cyclic olefin polymer) was used. The results are shown in Table 2.

COMPARATIVE EXAMPLES 12–13

The procedure of Example 18 was repeated except that the amount of the polycyclopentene was changed as shown in Table 2. The results are shown in Table 2.

COMPARATIVE EXAMPLES 14–15

The procedure of Example 18 was repeated except that the amounts of the polycyclopentene and talc were changed as shown in Table 2. The results are shown in Table 2.

EXAMPLE 28

The procedure of Example 18 was repeated except that the powdery homopolypropylene was changed to a powdery random ethylene-propylene copolymer containing 0.5 mole % of ethylene, having a melt flow rate of 1.8 g/10 min and the amount of the polycyclopentene was changed to 10 ppm by weight. The results are shown in Table 2.

EXAMPLES 29–30

The procedure of Example 18 was repeated except that the powdery random ethylene-propylene copolymer containing 0.5 mole % of ethylene, having a melt flow rate of 1.8 g/10 min was changed to a powdery random ethylene-propylene copolymer containing 1.0 mole % of ethylene, having a melt flow rate of 1.2 g/10 min (Example 29) and a powdery random butene-1-propylene copolymer containing 0.5 mole % of butene-1, having a melt flow rate of 2.0 g/10 min (Example 30). The results are shown in Table 2.

EXAMPLES 31–32

The procedure of Example 28 was repeated except that the amount of the polycyclopentene was changed and the average particle diameter and amount of talc were changed, as shown in Table 2. The results are shown in Table 2.

COMPARATIVE EXAMPLE 16

The procedure of Example 28 was repeated except that neither polycyclopentene (monocyclic olefin polymer) nor talc was used. The results are shown in Table 2.

COMPARATIVE EXAMPLES 17–18

The procedure of Example 32 was repeated except that the amount of the polycyclopentene was changed as shown in Table 2. The results are shown in Table 2.

COMPARATIVE EXAMPLES 19–20

The procedure of Example 28 was repeated except that the average particle diameter of talc was changed as shown in Table 2. The results are shown in Table 2.

EXAMPLE 33

(Synthesis of polycyclopentene-containing catalyst component)

100 ml of hexane, 50 mmol of methylaluminoxane and 0.05 mmol of dimethylsilylenebis(methylindenyl)zirconium dichloride were introduced into a 500-ml glass reactor equipped with a stirrer. The system inside was heated to 60° C. 7.7 g of cyclopentene was added and polymerization was conducted at 60° C. for 1 hour. The resulting solid portion was separated by decantation and washed with 200 ml of hexane five times to obtain a solid catalyst component containing 1.6 g of a polycyclopentene, 40 mmol of aluminum and 0.045 mmol of zirconium. The crystallinity of the catalyst component, possessed by the polycyclopentene was 64% as measured by X-ray diffractometry.

(Synthesis of master batch)

3,000 ml of toluene and 30 mmol of triisobutylaluminum were introduced into a 5,000-ml pressure reactor. The system inside was heated to 40° C. Thereinto was introduced the above-obtained polycyclopentene-containing solid catalyst component in an amount of 0.01 mmol (in terms of zirconium). A propylene pressure of 3 kgG/cm$^2$ was applied and polymerization was conducted at 40° C. for 1 hour. The reaction mixture was poured into acidic methanol to terminate the polymerization. Filtration was conducted to collect the resulting solid, and the solid was dried under reduced pressure to obtain 330 g of a polymer (a master batch). The polycyclopentene content in the polymer was 1,100 ppm by weight as a result of the calculation from the polycyclopentene content in the solid catalyst component.

The thus-obtained master batch containing 1,100 ppm by weight of a polycyclopentene was added to a homopolypropylene shown in Table 2, to obtain a polypropylene resin composition containing 11 ppm by weight of a polycyclopentene. Thereto was added talc shown in Table 2. The results are shown in Table 2.

TABLE 2-1

| | Crystalline polypropylene | | | | Polycyclo- | Talc | |
|---|---|---|---|---|---|---|---|
| | MFR (g/10 min) | Other comonomer (mole %) | Pentad fraction | Mw/Mn | pentene Content (ppm by wt.) | Particle diameter (μm) | Content (ppm by wt.) |
| Example | | | | | | | |
| 18 | 2.5 | — | 0.93 | 6.8 | 100 | 4.2 | 300 |
| 19 | 2.5 | — | 0.93 | 6.8 | 500 | 4.2 | 300 |
| 20 | 2.5 | — | 0.93 | 6.8 | 50 | 4.2 | 300 |
| 21 | 2.5 | — | 0.93 | 6.8 | 10 | 4.2 | 300 |
| 22 | 2.5 | — | 0.93 | 6.8 | 1 | 4.2 | 300 |
| 23 | 2.5 | — | 0.93 | 6.8 | 100 | 4.2 | 1000 |
| 24 | 2.5 | — | 0.93 | 6.8 | 100 | 4.2 | 500 |
| 25 | 2.5 | — | 0.93 | 6.8 | 100 | 4.2 | 100 |
| 26 | 2.5 | — | 0.93 | 6.8 | 100 | 1.2 | 300 |
| 27 | 2.5 | — | 0.93 | 6.8 | 100 | 6.1 | 300 |
| Comparative Example | | | | | | | |
| 10 | 2.5 | — | 0.93 | 6.8 | 0 | — | 0 |
| 11 | 2.5 | — | 0.93 | 6.8 | 0 | 4.2 | 300 |
| 12 | 2.5 | — | 0.93 | 6.8 | 0.05 | 4.2 | 300 |
| 13 | 2.5 | — | 0.93 | 6.8 | 10000 | 4.2 | 300 |
| 14 | 2.5 | — | 0.93 | 6.8 | 500 | 4.2 | 10 |
| 15 | 2.5 | — | 0.93 | 6.8 | 500 | 4.2 | 10000 |
| Example | | | | | | | |
| 28 | 1.8 | Ethylene (0.5) | 0.96 | 6.2 | 10 | 4.2 | 300 |
| 29 | 1.2 | Ethylene (1.0) | 0.96 | 6.2 | 10 | 4.2 | 300 |
| 30 | 2.0 | Butene-1 (0.5) | 0.97 | 7.8 | 10 | 4.2 | 300 |
| 31 | 1.8 | Ethylene (0.5) | 0.96 | 6.2 | 100 | 2.0 | 500 |
| 32 | 1.8 | Ethylene (0.5) | 0.96 | 6.2 | 1 | 2.0 | 100 |
| Comparative Example | | | | | | | |
| 16 | 1.8 | Ethylene (0.5) | 0.96 | 6.2 | 0 | — | 0 |
| 17 | 1.8 | Ethylene (0.5) | 0.96 | 6.2 | 0.01 | 2.0 | 100 |
| 18 | 1.8 | Ethylene (0.5) | 0.96 | 6.2 | 5000 | 2.0 | 100 |
| 19 | 1.8 | Ethylene (0.5) | 0.96 | 6.2 | 10 | 13.6 | 300 |
| 20 | 1.8 | Ethylene (0.5) | 0.96 | 6.2 | 10 | 0.08 | 300 |
| Example 33 | 3.0 | — | 0.97 | 6.2 | 11 | 4.2 | 500 |

TABLE 2-2

| | Stretched film | | Stretched film formability | | | |
|---|---|---|---|---|---|---|
| | Haze (%) | Image clarity (%) | Condition of sheet edge | Time of sheet cutting during stretching | Accuracy of film thickness | Times of film rupture during stretching |
| Example | | | | | | |
| 18 | 0.5 | 91 | ○ | 0 | ○ | 0 |
| 19 | 0.6 | 89 | ○ | 0 | ○ | 0 |
| 20 | 0.4 | 93 | ⊚ | 0 | ○ | 0 |

TABLE 2-2-continued

| | Stretched film | | Stretched film formability | | | |
|---|---|---|---|---|---|---|
| | Haze (%) | Image clarity (%) | Condition of sheet edge | Time of sheet cutting during stretching | Accuracy of film thickness | Times of film rupture during stretching |
| 21 | 0.4 | 93 | ⊚ | 0 | ⊚ | 0 |
| 22 | 0.6 | 90 | ⊚ | 0 | ⊚ | 0 |
| 23 | 0.6 | 91 | ⊚ | 0 | ○ | 0 |
| 24 | 0.5 | 92 | ○ | 0 | ○ | 0 |
| 25 | 0.5 | 90 | ○ | 0 | ○ | 0 |
| 26 | 0.4 | 93 | ○ | 0 | ⊚ | 0 |
| 27 | 0.6 | 90 | ○ | 0 | ○ | 0 |
| Comparative Example | | | | | | |
| 10 | 1.0 | 23 | ○ | 0 | ○ | 0 |
| 11 | 0.7 | 75 | ⊚ | 0 | ⊚ | 0 |
| 12 | 0.7 | 78 | ⊚ | 0 | ⊚ | 0 |
| 13 | 0.7 | 76 | x | 3 | x | 12 |
| 14 | 0.5 | 88 | x | 2 | x | 9 |
| 15 | 0.6 | 89 | Δ | 0 | Δ | 4 |
| Example | | | | | | |
| 28 | 0.4 | 93 | ⊚ | 0 | ⊚ | 0 |
| 29 | 0.4 | 94 | ⊚ | 0 | ⊚ | 0 |
| 30 | 0.5 | 92 | ⊚ | 0 | ⊚ | 0 |
| 31 | 0.4 | 94 | ○ | 0 | ○ | 0 |
| 32 | 0.6 | 89 | ⊚ | 0 | ⊚ | 0 |
| Comparative Example | | | | | | |
| 16 | 0.9 | 36 | ○ | 0 | ⊚ | 0 |
| 17 | 0.7 | 63 | ⊚ | 0 | ○ | 0 |
| 18 | 0.7 | 77 | x | 0 | x | 8 |
| 19 | 1.4 | 79 | ○ | 0 | Δ | 2 |
| 20 | 1.6 | 78 | ○ | 0 | Δ | 3 |
| Example 33 | 0.4 | 95 | ○ | 0 | ○ | 0 |

EXAMPLE 34

(Polymerization of cyclobutene)

500 ml of toluene, 500 mmol of methylaluminoxane and 0.5 mmol of dimethylsilylenebisindenylzirconium dichloride were introduced into a 2,000-ml glass reactor equipped with a stirrer, under a nitrogen atmosphere. The system inside was heated to 60° C. 200 ml of cyclobutene was added and polymerization was conducted at room temperature for 2 hours. The reaction mixture containing a solid product was poured into a large amount of acidic methanol to terminate the polymerization. Filtration was conducted to collect the solid product, followed by drying of the product under reduced pressure to obtain 135 g of a polycyclobutene. The polymer had a crystallinity of 68% as measured by X-ray diffractometry.

The subsequent procedure was the same as in Example 18 except that there were used the homopolypropylene and talc shown in Table 3 and 10 ppm by weight of the above-obtained polycyclobutene. The results are shown in Table 3.

EXAMPLE 35–36

The procedure of Example 34 was repeated except that the amount of the polycyclobutene was changed as shown in Table 3. The results are shown in Table 3.

COMPARATIVE EXAMPLES 21–22

The procedure of Example 34 was repeated except that the amount of the polycyclobutene was changed as shown in Table 3. The results are shown in Table 3.

EXAMPLES 37–38

The procedure of Example 36 was repeated except that the amount of talc was changed as shown in Table 3. The results are shown in Table 3.

TABLE 3

| | Crystalline polypropylene | | | | Polycyclopentene Content (ppm by wt.) | Talc | |
|---|---|---|---|---|---|---|---|
| | MFR (g/10 min) | Other comonomer (mole %) | Pentad fraction | Mw/Mn | | Particle diameter (μm) | Content (ppm by wt.) |
| Example | | | | | | | |
| 34 | 1.2 | — | 0.94 | 7.6 | 10 | 4.2 | 300 |

TABLE 3-continued

| | | | | | | | |
|---|---|---|---|---|---|---|---|
| 35 | 1.2 | — | 0.94 | 7.6 | 50 | 4.2 | 300 |
| 36 | 1.2 | — | 0.94 | 7.6 | 100 | 4.2 | 300 |
| Comparative Example | | | | | | | |
| 21 | 1.2 | — | 0.94 | 7.6 | 0.01 | 4.2 | 300 |
| 22 | 1.2 | — | 0.94 | 7.6 | 5000 | 4.2 | 300 |
| Example | | | | | | | |
| 37 | 1.2 | — | 0.94 | 7.6 | 100 | 4.2 | 1000 |
| 38 | 1.2 | — | 0.94 | 7.6 | 100 | 4.2 | 100 |

| | Stretched film | | Stretched film formability | | | |
|---|---|---|---|---|---|---|
| | Haze (%) | Image clarity (%) | Condition of sheet edge | Time of sheet cutting during stretching | Accuracy of film thickness | Times of film rupture during stretching |
| Example | | | | | | |
| 34 | 0.5 | 89 | ⊙ | 0 | ⊙ | 0 |
| 35 | 0.5 | 89 | ⊙ | 0 | ○ | 0 |
| 36 | 0.4 | 87 | ○ | 0 | ○ | 0 |
| Comparative Example | | | | | | |
| 21 | 0.7 | 69 | ⊙ | 0 | ⊙ | 0 |
| 22 | 0.6 | 78 | x | 0 | x | 4 |
| Example | | | | | | |
| 37 | 0.5 | 87 | ⊙ | 0 | ○ | 0 |
| 38 | 0.5 | 86 | ○ | 0 | ○ | 0 |

EXAMPLE 39

(Polymerization of cyclopentene)

500 ml of toluene, 500 mmol of methylaluminoxane and 0.5 mmol of dimethylsilylenebisindenylzirconium dichloride were introduced into a 2,000-ml glass reactor equipped with a stirrer, under a nitrogen atmosphere. The system inside was heated to 60° C. 100 ml of cyclopentene was added and polymerization was conducted at 60° C. for 4 hours. The reaction mixture containing a solid product was poured into a large amount of acidic methanol to terminate the polymerization. Filtration was conducted to collect the solid product, followed by drying of the product under reduced pressure to obtain 63.5 g of a polycyclopentene. The polymer had a crystallinity of 64% as measured by X-ray diffractometry.

(Preparation of pellets)

To 100 parts by weight of a powdery homopolypropylene shown in Table 1 were added 0.1 part by weight of 2,6-di-t-butylhydroxytoluene (antioxidant), 0.1 part by weight of calcium stearate (chlorine-capturing agent), 0.3 part by weight of stearyl diethanolamide (antistatic agent), 0.001 part by weight of the polycyclopentene (nucleating agent) obtained above, 0.2 part by weight of a crosslinked polymethyl methacrylate (PMMA) powder (anti-blocking agent) having an average particle diameter of 2.3 μm (particles= spherical) and 0.15 part by weight of a high-density polyethylene (HDPE) having a melt flow rate (MFR) of 4.0 g/10 min and a density of 0.963 g/cm³. They were mixed for 5 minutes by the use of a Henschel mixer. The mixture was extruded at 230° C. by the use of an extruder having a screw diameter of 65 mm, to obtain pellets as a film raw material.

(Production of biaxially stretched film)

The above-obtained pellets of a polypropylene resin composition was subjected to a test for production of biaxially stretched film according to the following method. The pellets were extruded at 280° C. by the use of a T-die sheet extruder having a screw diameter of 90 mm, followed by cooling by the use of a cooling roll of 30° C. to obtain a sheet having a thickness of 2 mm. The sheet was stretched by the use of a successive biaxial stretching machine of tenter type; that is, the sheet was stretched 4.6-fold in the longitudinal direction at 150° C. and successively 10-fold (in terms of mechanical draw ratio) in the transverse direction in a tenter of 165° C., followed by 8% relaxation and a heat treatment to form a biaxially stretched polypropylene film having a thickness of 50 μm, at a rate of 16 m/min. Prior to film winding, one side of the film was subjected to an ordinary corona discharge treatment (30 W min/m²). The resulting film was aged at 35° C. for 3 days and measured for haze (transparency), image clarity, anti-blocking property and number of voids (appearance). The results are shown in Table 4.

EXAMPLES 40–41

The procedure of Example 39 was repeated except that the amount of the polycyclopentene (nucleating agent) was changed as shown in Table 4. The results are shown in Table 4.

EXAMPLES 42–43

The procedure of Example 39 was repeated except that the amount of the crosslinked polymethyl methacrylate powder (anti-blocking agent) was changed as shown in Table 4. The results are shown in Table 4.

EXAMPLES 44–45

The procedure of Example 39 was repeated except that the amount of the high-density polyethylene was changed as shown in Table 4. The results are shown in Table 4.

EXAMPLES 46–47

The procedure of Example 39 was repeated except that there was used, as the anti-blocking agent, a cross-linked polymethyl methacrylate powder having an average particle diameter of 1.6 μm (particles=spherical) (Example 46) and the high-density polyethylene was changed to a linear low-density polyethylene (L-LPDE, an ethylene-1-hexene copolymer) having an MFR of 2.0 g/10 min and a density of 0.912 g/cm$^3$ (Example 47). The results are shown in Table 4.

COMPARATIVE EXAMPLE 23

The procedure of Example 39 was repeated except that none of the polycyclopentene (nucleating agent), the crosslinked polymethyl methacrylate (anti-blocking agent) and the high-density polyethylene was used. The results are shown in Table 4.

COMPARATIVE EXAMPLE 24

The procedure of Example 39 was repeated except that no polycyclopentene (nucleating agent) was used. The results are shown in Table 4.

COMPARATIVE EXAMPLES 25–26

The procedure of Example 39 was repeated except that the amount of the polycyclopentene (nucleating agent) was changed as shown in Table 4. The results are shown in Table 4.

COMPARATIVE EXAMPLES 27–28

The procedure of Example 39 was repeated except that the amount of the crosslinked polymethyl methacrylate powder (anti-blocking agent) was changed as shown in Table 4. The results are shown in Table 4.

COMPARATIVE EXAMPLES 29–30

The procedure of Example 39 was repeated except that the amount of the high-density polyethylene was changed as shown in Table 4. The results are shown in Table 4.

EXAMPLE 48

The procedure of Example 39 was repeated except that the powdery homopolypropylene was changed in a powdery propylene-ethylene random copolymer containing 0.5 mole % of ethylene, having an MFR of 1.8 g/10 min and the amount of the polycyclopentene (nucleating agent) was changed as shown in Table 4. The results are shown in Table 4.

EXAMPLES 49–50

The procedure of Example 48 was repeated except that the powdery propylene-ethylene random copolymer containing 0.5 mole % of ethylene, having an MFR of 1.8 g/10 min was changed to a powdery propylene-ethylene random copolymer containing 1.0 mole % of ethylene, having an MFR of 1.2 g/10 min (Example 49) or a powdery propylene-butene-1 random copolymer containing 0.5 mole % of butene-1, having an MFR of 2.0 g/10 min (Example 50). The results are shown in Table 4.

EXAMPLE 51

The procedure of Example 39 was repeated except that the anti-blocking agent was changed to 0.25 part by weight of spherical fused silica having an average particle diameter of 0.8 μm. The results are shown in Table 4.

EXAMPLE 52

The procedure of Example 39 was repeated except that the anti-blocking agent was changed to 0.08 part by weight of spherical fused silica having an average particle diameter of 2.2 μm. The results are shown in Table 4.

EXAMPLE 53

(Polymerization of cyclobutene)

500 ml of toluene, 500 mmol of methylaluminoxane and 0.5 mmol of dimethylsilylenebisindenylzirconium dichloride were introduced into a 2,000-ml glass reactor equipped with a stirrer, under a nitrogen atmosphere. The system inside was heated to 60° C. 200 ml of cyclobutene was added and polymerization was conducted at room temperature for 2 hours. The reaction mixture containing a solid product was poured into a large amount of acidic methanol to terminate the polymerization. Filtration was conducted to collect the solid product, followed by drying of the product under reduced pressure to obtain 135 g of a polycyclobutene. The polymer had a crystallinity of 68% as measured by X-ray diffractometry.

The subsequent procedure was the same as in Example 39 except that there was used a homopolypropylene shown in Table 4 and the above-obtained polycyclobutene of an amount shown in Table 4. The results are shown in Table 4.

TABLE 4-1

| | Crystalline polypropylene | | | | Monocyclic olefin polymer | | Anti-blocking agent | | |
|---|---|---|---|---|---|---|---|---|---|
| | MFR (g/10 min) | Other comonomer (mole %) | Pentad fraction | Mw/Mn | Kind | Amount (ppm by wt.) | Kind | Particle diameter (μm) | Amount (wt. parts) |
| Example | | | | | | | | | |
| 39 | 2.5 | — | 0.93 | 6.8 | Polycyclopentene | 10 | PMMA | 2.3 | 0.2 |
| 40 | 2.5 | — | 0.93 | 6.8 | Polycyclopentene | 100 | PMMA | 2.3 | 0.2 |
| 41 | 2.5 | — | 0.93 | 6.8 | Polycyclopentene | 2 | PMMA | 2.3 | 0.2 |

TABLE 4-1-continued

| | Crystalline polypropylene | | | | Monocyclic olefin polymer | | Anti-blocking agent | | |
|---|---|---|---|---|---|---|---|---|---|
| | MFR | Other | | | | | | Particle | |
| | (g/10 min) | comonomer (mole %) | Pentad fraction | Mw/Mn | Kind | Amount (ppm by wt.) | Kind | diameter (μm) | Amount (wt. parts) |
| 42 | 2.5 | — | 0.93 | 6.8 | Polycyclopentene | 10 | PMMA | 2.3 | 0.08 |
| 43 | 2.5 | — | 0.93 | 6.8 | Polycyclopentene | 10 | PMMA | 2.3 | 0.03 |
| 44 | 2.5 | — | 0.93 | 6.8 | Polycyclopentene | 10 | PMMA | 2.3 | 0.2 |
| 45 | 2.5 | — | 0.93 | 6.8 | Polycyclopentene | 10 | PMMA | 2.3 | 0.2 |
| 46 | 2.5 | — | 0.93 | 6.8 | Polycyclopentene | 10 | PMMA | 1.6 | 0.2 |
| 47 | 2.5 | — | 0.93 | 6.8 | Polycyclopentene | 10 | PMMA | 2.3 | 0.2 |
| Comparative Example | | | | | | | | | |
| 23 | 2.5 | — | 0.93 | 6.8 | — | — | — | — | — |
| 24 | 2.5 | — | 0.93 | 6.8 | — | — | PMMA | 2.3 | 0.2 |
| 25 | 2.5 | — | 0.93 | 6.8 | Polycyclopentene | 0.02 | PMMA | 2.3 | 0.2 |
| 26 | 2.5 | — | 0.93 | 6.8 | Polycyclopentene | 20000 | PMMA | 2.3 | 0.2 |
| 27 | 2.5 | — | 0.93 | 6.8 | Polycyclopentene | 10 | PMMA | 2.3 | 0.002 |
| 28 | 2.5 | — | 0.93 | 6.8 | Polycyclopentene | 10 | PMMA | 2.3 | 2.5 |
| 29 | 2.5 | — | 0.93 | 6.8 | Polycyclopentene | 10 | PMMA | 2.3 | 0.2 |
| 30 | 2.5 | — | 0.93 | 6.8 | Polycyclopentene | 10 | PMMA | 2.3 | 0.2 |
| Example | | | | | | | | | |
| 48 | 1.8 | Ethylene (0.5) | 0.96 | 6.2 | Polycyclopentene | 5 | PMMA | 2.3 | 0.2 |
| 49 | 1.2 | Ethylene (1.0) | 0.96 | 6.2 | Polycyclopentene | 5 | PMMA | 2.3 | 0.2 |
| 50 | 2.0 | Butene-1 (0.5) | 0.97 | 7.8 | Polycyclopentene | 5 | PMMA | 2.3 | 0.2 |
| 51 | 2.5 | — | 0.93 | 6.8 | Polycyclopentene | 10 | Silica | 0.8 | 0.25 |
| 52 | 2.5 | — | 0.93 | 6.8 | Polycyclopentene | 10 | Silica | 2.2 | 0.08 |
| 53 | 2.7 | — | 0.92 | 7.4 | Polycyclobutene | 50 | PMMA | 2.3 | 0.2 |

TABLE 4-2

| | Polyethylene | | | | Stretched film | | | |
|---|---|---|---|---|---|---|---|---|
| | Kind | MFR (g/10 min) | Density (g/cm³) | Amount (wt. parts) | Haze (%) | Image clarity (%) | Anti-blocking property (gf) | Appearance |
| Example | | | | | | | | |
| 39 | HDPE | 4.0 | 0.963 | 0.15 | 2.8 | 92 | <10 | o |
| 40 | HDPE | 4.0 | 0.963 | 0.15 | 2.7 | 89 | <10 | o |
| 41 | HDPE | 4.0 | 0.963 | 0.15 | 2.8 | 88 | <10 | o |
| 42 | HDPE | 4.0 | 0.963 | 0.15 | 2.4 | 91 | 240 | ⊚ |
| 43 | HDPE | 4.0 | 0.963 | 0.15 | 2.9 | 92 | 360 | ⊚ |
| 44 | HDPE | 4.0 | 0.963 | 0.3 | 3.1 | 91 | <10 | o |
| 45 | HDPE | 4.0 | 0.963 | 0.07 | 2.4 | 90 | <10 | o |
| 46 | HDPE | 4.0 | 0.963 | 0.15 | 2.6 | 92 | 80 | ⊚ |
| 47 | L-LDPE | 2.0 | 0.912 | 0.15 | 3.0 | 90 | <10 | ⊚ |
| Comparative Example | | | | | | | | |
| 23 | — | — | — | — | 1.0 | 23 | 2000< | ⊚ |
| 24 | HDPE | 4.0 | 0.963 | 0.15 | 2.9 | 68 | <10 | ⊚ |
| 25 | HDPE | 4.0 | 0.963 | 0.15 | 2.9 | 69 | <10 | o |
| 26 | HDPE | 4.0 | 0.963 | 0.15 | 3.3 | 78 | <10 | △ |
| 27 | HDPE | 4.0 | 0.963 | 0.15 | 2.6 | 91 | 1680 | ⊚ |
| 28 | HDPE | 4.0 | 0.963 | 0.15 | 5.8 | 90 | <10 | x |
| 29 | HDPE | 4.0 | 0.963 | 0.001 | 3.2 | 92 | <10 | x |
| 30 | HDPE | 4.0 | 0.963 | 3.0 | 6.7 | 90 | <10 | o |
| Example | | | | | | | | |
| 48 | HDPE | 4.0 | 0.963 | 0.15 | 2.8 | 89 | <10 | ⊚ |
| 49 | HDPE | 4.0 | 0.963 | 0.15 | 2.7 | 90 | <10 | ⊚ |
| 50 | HDPE | 4.0 | 0.963 | 0.15 | 2.8 | 90 | <10 | ⊚ |
| 51 | HDPE | 4.0 | 0.963 | 0.15 | 2.4 | 91 | <10 | ⊚ |
| 52 | HDPE | 4.0 | 0.963 | 0.15 | 2.2 | 91 | 320 | ⊚ |
| 53 | HDPE | 4.0 | 0.963 | 0.15 | 2.0 | 92 | 410 | ⊚ |

What is claimed is:

1. A stretched polypropylene film comprising a crystalline polypropylene and a monocyclic olefin polymer, wherein the content of the monocyclic olefin polymer is 0.1–1,000 ppm by weight and which film is stretched at least monoaxially.

2. A stretched polypropylene film according to claim 1, wherein the crystalline polypropylene is a propylene homopolymer or a random copolymer of 90 mole % or more of propylene and 10 mole % or less of other α-olefin.

3. A stretched polypropylene film according to claim 1, wherein the crystalline polypropylene has a melt flow rate of 0.01–100 g/10 min.

4. A stretched polypropylene film according to claim 1, wherein the crystalline polypropylene has a melt flow rate of 0.1–50 g/10 min.

5. A stretched polypropylene film according to claim 1, wherein the crystalline polypropylene has a melt flow rate of 1–10 g/10 min.

6. A stretched polypropylene film according to claim 1, wherein the crystalline polypropylene has a fraction of isotactic pentad sequence, of 0.85 or more.

7. A stretched polypropylene film according to claim 1, wherein the crystalline polypropylene has a molecular weight distribution (Mw/Mn), which is a ratio of weight-average molecular weight (Mw) to number-average molecular-weight (Mn), of 6–20.

8. A stretched polypropylene film according to claim 1, wherein the monocyclic olefin polymer is a homopolymer of a compound represented by the following formula

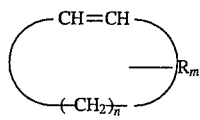

(wherein n is an integer of 2–3, and the hydrogen atoms may be replaced by a m alkyl groups R each having 1–4 carbon atoms (m is an integer of 0 to (2n+2))), a block or random copolymer between the above compounds, or a block or random copolymer between 50 mole % or more of the above compound and 50 mole % or less of other monomer.

9. A stretched polypropylene film according to claim 1, wherein the monocyclic olefin polymer is a polycyclobutene or a polycyclopentene.

10. A stretched polypropylene film according to claim 1, wherein the monocyclic olefin polymer has a crystallinity of 10% or more.

11. A stretched polypropylene film according to claim 1, wherein the monocyclic olefin polymer has a crystallinity of 30% or more.

12. A stretched polypropylene film according to claim 1, wherein the monocyclic olefin polymer has a crystallinity of 50% or more.

13. A stretched polypropylene film according to claim 1, wherein the content of the monocyclic olefin polymer is 0.5–500 ppm by weight.

14. A stretched polypropylene film according to claim 1, wherein the content of the monocyclic olefin polymer is 0.5–100 ppm by weight.

15. A stretched polypropylene film according to claim 1, wherein the content of the monocyclic olefin polymer is 1–20 ppm by weight.

16. A stretched polypropylene film according to claim 1, which has a thickness of 3–254 μm.

17. A stretched polypropylene film according to claim 1, which is a monoaxially stretched film obtained by stretching of 4- to 10-fold (draw ratio) in a monoaxial direction.

18. A stretched polypropylene film according to claim 1, which is a biaxially stretched film obtained by stretching of 4- to 10-fold (draw ratio) in a monoaxial direction and subsequent stretching of 4- to 15-fold (draw ratio) in a direction intersecting said direction at right angles.

19. A stretched polypropylene film according to claim 1, which further comprises talc having an average particle diameter of 0.1–10 μm in an amount of 50–4,000 ppm by weight.

20. A stretched polypropylene film according to claim 19, wherein the average particle diameter of talc is 0.5–8.0 μm.

21. A stretched polypropylene film according to claim 19, wherein the average particle diameter of talc is 1.0–7.0 μm.

22. A stretched polypropylene film according to claim 19, wherein the content of talc is 80–2,000 ppm by weight.

23. A stretched polypropylene film according to claim 19, wherein the content of talc is 100–1,000 ppm by weight.

24. A stretched polypropylene film according to claim 1, which further comprises an anti-blocking agent and a polyethylene each in an amount of 0.01–1.0 part by weight per 100 parts by weight of the crystalline polypropylene.

25. A stretched polypropylene film according to claim 24, wherein the anti-blocking agent is silica, alumina, a crosslinked polymethyl methacrylate powder, a non-fused type silicone resin powder or a melamine resin powder.

26. A stretched polypropylene film according to claim 24, wherein the anti-blocking agent has an average particle diameter of 0.1–5.0 μm.

27. A stretched polypropylene film according to claim 24, wherein the anti-blocking agent has an average particle diameter of 0.5–3.0 μm.

28. A stretched polypropylene film according to claim 24, wherein the content of the anti-blocking agent is 0.02–0.5 part by weight per 100 parts by weight of the crystalline polypropylene.

29. A stretched polypropylene film according to claim 24, wherein the content of the anti-blocking agent is 0.05–0.3 part by weight per 100 parts by weight of the crystalline polypropylene.

30. A stretched polypropylene film according to claim 24, wherein the polyethylene is an ethylene homopolymer or a copolymer between 90 mole % or more of ethylene and 10 mole % or less of an α-olefin.

31. A stretched polypropylene film according to claim 24, wherein the content of the polyethylene is 0.02–0.5 part by weight per 100 parts by weight of the crystalline polypropylene.

32. A stretched polypropylene film according to claim 24, wherein the content of the polyethylene is 0.05–0.3 part by weight per 100 parts by weight of the crystalline polypropylene.

* * * * *